United States Patent Office 3,247,078
Patented Apr. 19, 1966

3,247,078
PROCESS FOR THE PROPAGATION OF MICRO-ORGANISMS USING A MATRIX OF POLY(ETH-YLENE OXIDE)
Richard A. Herrett, Raleigh, N.C., assignor to Union Carbide Corporation, a corporation of New York
No Drawing. Filed Oct. 30, 1963, Ser. No. 319,974
3 Claims. (Cl. 195—102)

This application is a continuation-in-part of copending application Serial No. 164,603, filed January 5, 1962, and now abandoned.

The present invention relates to a novel process for the propagation of living cells. More particularly, the present invention relates to a novel process which employs an improved propagating medium or stratum for bacteria, fungi and tissues of more complex organisms.

Artisans have utilized several types of solid phases in preparation of culture growing substratum; they include gelatin and a material commonly referred to as agar.

Agar, over the years, has become the standard solid phase utilized in the art of culture growing. This material is prepared from various species of Gelidium and closely related algae, and has been defined as the dried amorphous, gelatin-like non-nitrogenous extract from Gelidium and other algae, being the sulfuric acid ester of a linear polysaccharide. The material is insoluble in cold water but soluble in hot water. A dilute, neutral aqueous solution (1 to about 2%) sets upon cooling to a firm gel solidifying at about 35 to about 50° C. and melting at about 90° to about 100° C.

Many problems are associated with the use of agar which is derived from biological sources. First, use of different species and genera of algae to produce agar results in an agar solid phase differing in gel strength, elasticity, syneresis, viscosity, transparency, ash content, and content of impurities. Changes in environment, temperature, and light, for example, are known to affect the type agar produced by various algae. Thus, variations in the properties of agar due to the type of algae and the season of the year are observed.

The lack of stability exhibited by agar in an acidic environment is another problem inherent in the use of naturally occurring agar. Stability of natural agar is dependent upon the presence of the calcium or magnesium salt of the sulfuric acid ester of a linear gelactam. Formation of the agar acid at a pH of 5 or below followed by heating, such as autoclaving which is a standard sterilization method in the culture growing art, results in the complete hydrolysis of the agar and therefore dissolution of the agar and complete loss of its gel forming properties.

Digestion by certain bacteria, some thirty species found mainly in the two orders Eubacteriales and Myxobacterials, is another problem encountered in the use of agar from natural sources. Unidentified soil-residing bacteria also digest agar.

In addition to the fact that various bacteria actually digest the agar, there are many instances where the bacteria, although they do not cause complete break-down of the agar, do obtain some sustenance from the agar solid phase in the culture growing medium and consequently qualitative and quantitative culture growing with various specific nutrients in relation to set standard media is virtually impossible.

In the use of agar as a culture growing medium, it is required that an artisan go through a standard set of steps to render the agar insoluble, that is, the agar must be heated in admixture with a nutrient to a temperature ranging from about 90 to 100 and then the admixture must be cooled to about 35–50° C. to produce the gel-like material. After standing the agar containing medium will dry out and of course another heating and cooling step is required to cause the agar to again reincorporate water to form gel-like material.

It is an object of the present invention to provide a process which employs a medium or stratum for culture propagation which is characterized by chemical purity.

It is another object to provide a process employing a medium or stratum for use with nutrients for propagation of living matter which medium or stratum is insoluble in water and organic liquids irrespective of temperature and which reversibly incorporates and loses liquid, solutions and suspensions without heating.

It is another object to provide a process for the propagation of living matter in which the culture medium or stratum can be repeatedly sterilized at high temperature without detrimentally affecting the ability of the solid phase to retain nutrient, can be repeatedly frozen without detrimentally affecting the ability of the solid phase to retain nutrient, and is capable of reincorporation of the lost liquid merely by contact with additional amounts of liquid without the necessity of heating and cooling steps.

The process of this invention comprises the steps of (1) providing a nutrient for a micro-organism in admixture with a matrix of poly(ethylene oxide) or other polymer of organic ethers as described hereinbelow, the matrix being characterized by insolubility in water irrespective of the temperature and the ability to incorporate at least the dispersing phase of the nutrient into the matrix, (2) sterilizing the nutrient-matrix propagating medium, and (3) inoculating the sterilized medium with the micro-organism. Preferred micro-organisms for use in the process of this invention are bacteria and fungi.

The propagating medium or stratum for use in the process of this invention is comprised of a nutrient in admixture with an insoluble polymeric material.

The polymeric materials amenable for use in the present invention are characterized by the fact that they are substantially insoluble in water and/or most organic liquids. The insoluble polymers are also characterized by the fact that they remain insoluble in water irrespective of temperature. In the insoluble particulate form they generally comprise a polymeric matrix. The particulate polymeric materials are further characterized by the fact that they will incorporate and retain water, aqueous solutions and aqueous colloidal suspensions within their polymeric matrix. The subject polymeric materials are also characterized by the fact that although they will suffer loss of liquids, solutions and colloids from within their polymeric matrix periods of time at standard temperature and pressure, liquid may be reincorporated into the polymeric matrix simply by contact between the matrix and liquid without the necessity of heating the matrix to elevated temperature and then cooling back to room temperature. The polymeric materials are also characterized by the fact that they form gel-like material without heating and cooling by rapid incorporation of liquid, especially when the material is in the particulate state.

In most instances the polymeric material utilized in the present invention will swell upon contact with liquids, solutions and suspensions by incorporating the liquids, solutions and suspensions into the polymeric matrix of the material. In the present invention it is preferred to utilize polymeric materials capable of incorporating sufficiently large amounts of liquids, solutions or suspensions into their matrix to form gel-like products which, while they contain large amounts of liquids, will exhibit substantial resistance to shear or deformation; that is the resistance to shear or deformation of the swollen polymeric materials whether in large shapes or forms or in particulate form, at low temperatures, near room temperatures, is greater than that exhibited by highly viscous solutions.

Indeed, the gel-like products will take and hold the form of the vessels in which they are prepared.

The insoluble polymeric materials amenable for use in the present invention are still further characterized by the fact that swollen particles of the polymeric materials can be formed into a coherent mass which may range from a free flowing mixture to a formable mixture which is capable of generally retaining a shape by adjusting the amount of liquid in the mass.

Insoluble polymeric materials possessing the aforementioned characteristics and amenable for use in the present invention include water insoluble homopolymers of ethers, water insoluble homopolymers of substituted ethers, and water insoluble copolymers of ethers and substituted ethers.

Several insoluble polymeric matrices especially amenable for use in the present invention because they possess the aforementioned characteristics in addition to the ability to incorporate very large amounts of water in the order of 10 to 100 times their dry weight include the following water insoluble polymeric materials; water insoluble poly(ethylene oxide), water insoluble copolymers of ethylene oxide and propylene oxide, and water insoluble alkyl substituted phenyl ethers of ethylene oxide polymers wherein the alkyl groups may be methyl and/or butyl. All the water insoluble polymers named immediately above, in addition to possessing the ability to incorporate large amounts of water, are insoluble in water irrespective of temperature, will retain liquids, solutions and suspensions and will form gel-like products as well as all the other aforementioned characteristics.

The water insoluble polymers mentioned immediately above may be conveniently prepared by utilizing ionizing radiation. As used herein, the term "ionizing radiation" includes that radiation which has sufficient energy to cause electronic excitation and/or ionization in the polymer molecules and solvent molecules (where a solvent is employed) but which does not have sufficient energy to affect the nuclei of the constituent atoms. Convenient sources of suitable ionizing radiation are gamma ray producing radioactive isotopes such as $Co^{60}$ and $Cs^{137}$, spent nuclear fuel elements, X-rays, such as those produced by conventional X-ray machines, and electrons produced by such means as Van de Graaff accelerators, linear electron accelerators, resonance transformers and the like. Suitable ionizing radiation for use in the present invention will generally have an energy level in the range from about 0.05 mev. to about 20 mev.

The irradiation of the non-crosslinked (and usually water soluble) polymers can be carried out in the solid phase or in solution. Solid polymers can be irradiated in the air, in a vacuum, or under various gaseous atmospheres, while irradiation in solution can be carried with the polymer dissolved in water, in conventional organic solvents, or in mixtures of water and water miscible organic solvents. Any convenient method can be used to bring the solid polymer or polymer solution into contact with the ionizing radiation. Suitable methods are well known and understood by those skilled in the art.

The exact amount of ionizing radiation to which the polymers must be subjected depends on a number of variables. In general, when irradiation is carried out at relatively low rates and in the presence of free radical scavengers, such as oxygen, extremely high total doses are required to produce the water insoluble materials useful in this invention. On the other hand, when the irradiation is carried out under conditions which favor the relatively long existence of the free radicals produced, as for example, when the irradiation is carried out with a high dose rate, in the absence of oxygen, or in solution where oxygen is rapidly used up, the formation of water insoluble polymeric materials useful in this invention takes place readily. The preferred method for producing the water insoluble polymers useful in this invention which have the highest water absorptive capacity is to carry out the irradiation on an aqueous solution of the polymer while employing ionizing radiation having an energy level in the range of about 0.50 mev. to about 20 mev. at a total dose of between about 0.05 and 10 megarads.

Production of the insoluble polymeric material by the preferred method, e.g. submission of the solutions of polymers to ionizing radiation, comprises preparing a homogeneous water solution of the starting polymeric materials, submitting the solution to ionizing radiation for a period of time sufficient to cause the formation of a gel-like material, removing the water from the gel-like material and recovering the dry residue. The product produced by irradiation of the starting polymers in a water solution is a gel-like material reversibly holding large amounts of water. The water is then removed by known processes such as evaporation under low pressures and/or elevated temperatures to leave a solid de-watered residue. The de-watered residue is utilized as the solid phase in preparation of the novel culture growing (propagating) medium herein disclosed.

The de-watered solid polymeric phase may be subdivided into particles of small size by known processes such as normal grinding operations and grinding the polymeric material at low temperatures.

The culture growing medium is then prepared by admixing a desired amount of the solid de-watered insoluble polymeric material with a nutrient to form a propogating medium ranging from a watery consistency to dimensionally stable mediums.

The ratio of nutrient incorporated in the polymeric matrices to the polymeric material can be conveniently varied by regulation of the molecular weight of polymer, concentration of polymer and irradiation dosage utilized in processes employing ionizing radiation for preparation of the polymeric solid phase. In general, decreasing concentration of polymer in the starting solution, use of higher molecular weight polymer and lower irradiation dosage leads to production of an insoluble polymeric matrix which incorporates larger amounts of water and nutrient.

The consistency of the culture growing medium can be regulated independent of the ratio of incorporated nutrient to solid polymeric phase by control of the total nutrient used in preparation of the medium. That is, use of increasing amounts of nutrient over and above that incorporated by the polymeric matrix lead to increasing fluidity in the final medium.

In many instances it may be desirable to prepare the solid gel-like materials in tablet form by irradiation of the starting solutions in small cups of various shapes. The resulting gel-like material, in tablet form, may be purged of water and put in contact with the nutrient. The de-watered insoluble polymeric material will then swell by incorporation of the nutrient to the shape and size of the original tablet form. The tablets may also be prepared from particulate material by conventional techniques such as molding, extrusion, etc.

The term "nutrient," while well established in the art to indicate the material which provides nourishment to bacteria, fungi and tissues of more complex organisms, is specifically defined herein to include a wide variety of particular nutritional, diagnostic and/or growth factor species in a dispersing medium such as water and/or organic liquids.

Nutrients in general consist of aqueous dispersing liquids containing any one or combination of a variety of nutritional species. The particular nutritional species may exist as true solutes in the dispersing medium and/or as colloidal suspensions. In the present invention the term "nutrient" is defined to include nutritional species in organic dispersing liquids in addition to aqueous dispersing liquids.

The nutritional species include the broad classes; e.g. proteins and their degradation products, nucleic acid and the degradation products thereof, carbohydrates, fats, vitamins, hormones, diagnostic agents, dyes, and macro and nicro inorganic nutrients.

More particularly the term nutrient includes the following nutritional species; the proteins ranging from the polypeptides such as peptone or proteose to the amino acids, respectively present in the dispersing medium as colloids in the case of polypeptides or true solutes in the case of amino acids; nucleic acid ranging from the highest molecular weight polymers, which may be present as colloids, through polynucleotides or oligio nucleotides to monomeric nucleotides normally present as true solutes; carbohydrates ranging from colloidal polysaccharides such as starch, dextrin and glycogen through the oligio saccharides to simple solutes of mono and disaccharides such as glucose and sucrose; fats and lipiodal material such as fat-protein complexes as either colloidal materials or as true solutes; growth factors such as the vitamins, generally present at low concentrations such as .01 weight percent or less; small amounts of hormonal growth factors; diagnostic agents including antibiotics such as penicillin, germicides and antiseptics such as phenols; dyes such as eosin and methylene blue; macro nutrients such as calcium, sodium, potassium, sulfur, sulphates, nitrogen, nitrates, phosphorus, phosphates and iron; and micro nutrients or trace elements such as cobalt, zinc, iodine, vanadium, boron, manganese and copper.

In the admixture of solid polymeric phase and nutrient, the nutrient may be reversibly held in the interstices of the polymeric matrix itself especially when the nutritional species is a liquid or a true solute in the dispersing medium. The colloidal nutritional species may be present either on the surface of the polymeric solid phase or in the interstices of the matrix. In any event the nutrient is readily available for utilization by the micro-organisms being cultivated on the medium.

The nutrient-matrix combination which forms the propagating medium used in this invention can be sterilized by any convenient technique, for example by heating to elevated temperatures in vacuum or under an atmosphere of inert gas (dry sterilization), by contacting with steam at temperatures of 100° C. or above, or by chemical methods such as contacting with a 1–5 weight percent aqueous solution of sodium hypochlorite. A preferred sterilization procedure is to contact the nutrient-matrix combination with steam at a temperature of about 100° C. to 130° C., conveniently in an autoclave operating at a steam pressure of 15 pounds per square inch gauge.

In the process of the present invention, any standard inoculation techniques can be employed, for example, applying liquid suspensions of viable spores to the propagating medium, transferring an intact plant tissue containing bacteria to the propagating medium, and the standard streak-plate and pour-plate methods for isolation of inoculum species.

By way of illustration, the following embodiments are presented to illustrate the process of this invention.

In an example of the present invention, a solution of water soluble poly(ethylene oxide) containing two weight percent poly(ethylene oxide) was prepared. The solution was then irradiated with gamma rays from a $Co^{60}$ source until the material had adsorbed about $8 \times 10^5$ rads to produce a water-insoluble gel-like material comprising a water insoluble poly(ethylene oxide) matrix retaining about fifty times its weight in water. This gel-like material was dried and ground in the presence of liquid nitrogen to a fine particulate form.

Approximately one gram of the ground water insoluble poly(ethylene oxide) material was mixed with 9 milliliters of Richards nutrient thereby forming the gel-like propagating medium. After incorporation of the nutrient by the insoluble poly(ethylene oxide) material, the resulting medium took on the appearance of a clear formable mass. The medium was sterilized for 30 minutes at 100° C. and inoculated by standard streak methods with *Fusanium oxysporum, Alternaria olearaceae* and *Monilina fructicola*.

In addition, a standard agar containing medium was prepared with Richards nutrient and inoculated with the same species of organisms. Comparison of the poly(ethylene oxide); containing medium with the agar containing medium after three days showed that the former, i.e. the poly(ethylene oxide) containing medium, had considerably more organism development.

In another illustration, propagating mediums were prepared with a poly(ethylene oxide) matrix and a bacto-agar matrix in the manner described above but were not inoculated. When the mediums were opened to naturally-occurring airborne contaminants, the poly(ethylene oxide) medium showed much more culture growing activity as judged by the number of cultures per plate in the poly(ethylene oxide) containing medium. This indicates a more favorable condition for the germination of spores in the medium used in this invention over the well known agar medium.

The medium employed in this invention does not experience syneresis (i.e. contraction) upon standing. Micro-organisms are not known to digest the present novel insoluble polymeric phases. The present products are stable in both acidic and basic environments. The solid water insoluble polyether material, by its nature, does not itself provide nutritional species for the micro-organisms. The latter advantage is of great importance in quantitative and qualitative experimentation and in isolation microbiology, such as water pollution studies and milk bacteriology. It enables an artisan to prepare an invariant standard, then, utilizing the present pure polymeric solid phase, numerous nutritional diagnostic agents and growth factors may be studied qualitatively and quantitatively as independent variables. Results are not clouded by the possibility that the solid phase is providing an agent which affects the results as is the case in the use of agar as a solid phase.

It is unnecessary to heat the medium used in the present invention to cause gel-formation as required with gelatin and agar mediums. This is of particular importance where the nutrient is labile at elevated temperatures. To form a sterile cultivation medium with the present material, an artisan need only contact sterile solid polymeric material with a sterile nutrient on sterile plates and a sterile culture-growing medium will be formed. Prior art agar mediums must be prepared by solubilizing the agar in the nutrient by heating to elevated temperatures, then cooling the solution to cause gel formation.

In addition the use of the herein disclosed polymeric matrices contributes flexibility to preparation of the mediums; that is, the nutrient may be incorporated in the non-sterile condition and then sterilized in situ with the sterilization of the medium. The latter may be accomplished repeatedly at elevated temperature without affecting the ability of the medium to form a gel-like material. Preformed standard intermediates can be made utilizing polymeric materials. A standard medium can be prepared and the water and/or organic dispersing medium can be removed by evaporation, for example. The resultant product comprises a dried polymeric matrix containing, as an integral part thereof, nutritional, diagnostic and/or growth factor agents. This preformed intermediate is in a convenient form for shipping. Immediately prior to use the intermediate can be efficiently transformed into a standard medium simply by exposing the former to water and/or organic dispersing liquid.

The present medium is stabile and retains its ability to incorporate nutrients by sorption even after repeated autoclaving and/or freezing, whereas agar loses its hydrogel properties under similar conditions.

By way of illustration, the herein described insoluble poly(ethylene oxide) material was prepared by allowing the solid phase to incorporate a standard Richards nutrient media for 2 hours. After 3 successive autoclaving treatments at temperatures of 100° C. the medium showed no indication of degradation or loss of its gel-forming ability. On the other hand, an agar medium containing the same nutrient loses its ability to form a gel after two successive autoclaving treatments at the same temperature.

In addition, a water insoluble poly(ethylene oxide) medium prepared in the above manner was quick frozen to a temperature of −80° C. four successive times without becoming cloudy or without loss of its ability to retain the nutrient. Agar tends to elutriate the nutrient and/or dispersing medium after a single treatment and also becomes cloudy after a single treatment.

What is claimed is:

1. A process for the propagation of a microorganism selected from the class consisting of bacteria and fungi which comprises: (1) providing a nutrient for said microorganism in admixture with a matrix of poly(ethylene oxide), said matrix being characterized by insolubility in water irrespective of temperature and the ability to incorporate at least the dispersing phase of said nutrient into said matrix, (2) sterilizing said nutrient-matrix propagating medium, and (3) inoculating said medium with said microorganism.

2. A process for the propagation of bacteria which comprises: (1) providing a nutrient for said bacteria in admixture with a matrix of poly(ethylene oxide), said matrix being characterized by insolubility in water irrespective of temperature and the ability to incorporate at least the dispersing phase of said nutrient into said matrix, (2) sterilizing said nutrient-matrix propagating medium by contacting with steam at about 100° C. to 130° C., and (3) inoculating said medium with said bacteria.

3. A process for the propagation of fungi which comprises: (1) providing a nutrient for said fungi in admixture with a matrix of poly(ethylene oxide), said matrix being characterized by insolubility in water irrespective of temperature and the ability to incorporate at least the dispersing phase of said nutrient into said matrix, (2) sterilizing said nutrient-matrix propagating medium by contacting with steam at about 100° C. to 130° C., and (3) inoculating said medium with said fungi.

References Cited by the Examiner
UNITED STATES PATENTS

| | | | |
|---|---|---|---|
| 2,970,948 | 2/1961 | Stevens | 195—102 |
| 3,046,201 | 7/1962 | White et al. | 195—100 |

A. LOUIS MONACELL, *Primary Examiner.*